3,253,056
RUBBER STABILIZED WITH 4,4'-METHYLENEBIS-(2-METHYL-6-TERT-BUTYLPHENOL)
Thomas H. Coffield, Farmington, and Allen H. Filbey, Walled Lake, Mich., assignors to Ethyl Corporation, New York, N.Y., a corporation of Virginia
No Drawing. Filed Mar. 1, 1962, Ser. No. 176,765
2 Claims. (Cl. 260—807)

This application is a continuation-in-part of application Serial No. 738,033, filed May 27, 1958, entitled "Rubber Composition," now abandoned.

This invention relates to the stabilization of natural and synthetic rubber against oxidative deterioration.

Phenyl-$\beta$-napthylamine is widely used commercially as a rubber stabilizer. While this compound is quite effective, it is known to be objectionable because it discolors white and other light-colored stocks, such as stocks used for the white side walls of tires and light-colored mechanical goods, etc. Other antioxidants have been proposed and used which exhibit non-discoloration and non-staining characteristics. However, these other antioxidants are, in general, less effective than phenyl-$\beta$-naphthylamine. They also possess the disadvantage of being more expensive and difficult to prepare. Thus, the need exists for a novel stabilizer for rubber which is both very effective in protecting the rubber against oxidative deterioration and characterized by possessing non-staining and non-discoloration characteristics.

An object of this invention is to provide rubber compositions which are stable against oxidative deterioration. Another object is to provide stabilized rubber compositions which are characterized by non-discoloration and non-staining characteristics. A further object is to provide methods of preserving natural and synthetic rubber. Other important objects of this invention will be apparent from the ensuing description.

The above and other objects of this invention are accomplished by providing rubber containing as an antioxidant therefor, 4,4'-methylenebis(2-methyl-6-tert-butylphenol). Another part of this invention is the method of preserving rubber which comprises incorporating therein 4,4'-methylenebis(2-methyl-6 - tert - butylphenol). The stabilizer is incorporated into the rubber by milling, Banbury mixing, or similar process, or is emulsified and the emulsions added to the rubber latex before coagulation. In the various embodiments of this invention, the 4,4'-methylenebis(2-methyl-6-tert-butylphenol) stabilizer is used in small amounts, generally ranging from about 0.01 to about 5.0 percent, based on the rubber.

As used in the description and claims, the term "a rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadienestyrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the stabilizer—4,4'-methylenebis(2-methyl-6-tert-butylphenol)—is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

Another notable advantage provided by this invention is that the rubber compositions of this invention need no synergist to co-act with the phenolic additive to enhance their stability. Indeed, compounds which are normally considered synergists such as the alkylated and unalkylated hydroquinones show no appreciable effect when additionally incorporated into the compositions of this invention.

The present invention will be still further apparent from the following specific examples wherein all parts and percentages are by weight.

*Example I*

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercapto-benzothiazole is incorporated 1.5 parts of 4,4'-methylenebis(2-methyl - 6 - tert - butylphenol). This batch is then cured for 60 minutes at 45 p.s.i. of steam pressure.

*Example II*

One percent of 4,4'-methylenebis(2 - methyl - 6 - tert-butylphenol) is added to a synthetic rubber master batch comprising 100 parts of GR–S rubber having an average molecular weight of 100,000, 5 parts of zinc stearate, 50 parts of carbon black, 5 parts of road tar, 2 parts of sulfur and 1.5 parts of mercapto-benzothiazole. This batch is then cured as described in Example I.

*Example III*

Two parts of 4,4'-methylenebis(2-methyl-6-tert-butylphenol) is incorporated in 100 parts of raw butyl rubber prepared by the copolymerization of 90 percent of isobutylene and 10 percent of isoprene.

*Example IV*

To 200 parts of raw butyl rubber prepared by copolymerization of 95 percent of isobutylene and 5 percent of butadiene is added 1.5 parts of 4,4'-methylenebis(2-methyl-6-tert-butylphenol).

*Example V*

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 4,4'-methylenebis(2-methyl-6-tert-butylphenol).

*Example VI*

To natural rubber (Hevea) is added 0.1 percent of 4,4'-methylenebis(2-methyl-6-tert-butylphenol).

Example VII

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 4,4'-methylenebis(2-methyl-6-tert-butylphenol) | 1 |
| Benzothiazyl disulfide | 0.4 |
| Amine activator | 0.5 |

This stock is then vulcanized for 60 minutes at 280° F.

Example VIII

A butadiene-acrylonitrile co-polymer is produced from butadiene-1,3 and 32 percent of acrylonitrile. Two percent (based on the dry weight of the co-polymer) of 4,4'-methylenebis(2-methyl-6-tert-butylphenol) is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Example IX

Three percent of 4,4'-methylenebis(2-methyl-6-tert-butylphenol) emulsified in sodium oleate is added to a rubber-like, co-polymer of butadiene-1,3 and styrene containing 25 percent of combined styrene.

Example X

A rubber stock is compounded from 100 parts of smoked sheet rubber, 60 parts of zinc oxide, 20 parts of lithopone, 2 parts of sulfur, 0.7 part of diphenyl quanidine phthalate, 0.8 part of benzoyl thiobenzothiazole, 0.2 part of paraffin and 2 parts of 4,4'-methylenebis(2-methyl-6-tert-butylphenol). The stock so compounded is cured by heating for 45 minutes at 126° C. in a press.

Each of the above illustrative rubber compositions of this invention possesses greatly improved resistance against oxidative deterioration as compared with the corresponding rubber compositions which are devoid of an antioxidant. Moreover, the light colored stocks of the above examples exhibit virtually no discoloration or staining characteristics even when subjected to severe weathering conditions and the like. The methods of formulating the improved rubber compositions of this invention will now be clearly apparent to those skilled in the art.

To illustrate the enhanced oxygen resistance of the rubber compositions of this invention and the excellent non-staining and non-discoloration characteristics of 4,4'-methylenebis(2-methyl-6-tert-butylphenol), a light-colored stock is selected for test. This stock has the following composition.

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 4,4'-methylenebis(2-methyl-6-tert-butylphenol) and individual samples are cured for 20, 30, 45 and 60 minutes at 274° C. using perfectly clean molds with no mold lubricant. Another set of samples of the same base formula which does not contain an antioxidant is cured under the same conditions. For comparative purposes, still another set containing one part by weight of phenyl-β-naphthylamine is cured in the identical fashion.

To demonstrate the protection afforded to the rubber by 4,4'-methylenebis(2-methyl-6-tert-butylphenol) and to contrast the same with the protection afforded by phenyl-β-naphthylamine, the tensile strength and the ultimate elongation of stocks prepared by the addition of these inhibitors is determined before and after aging. These properties are also determined on the inhibitor-free stocks. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occurred during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

The results of these tests show that the inhibitor of this invention—4,4' - methylenebis(2-methyl-6-tert-butylphenol)—is a superior rubber antioxidant.

Furthermore, on exposure to ultraviolet light in the weatherometer, it is noted that the typical composition of this invention possess only a slight discoloration, whereas the sample containing phenyl-β-naphthylamine exhibits a marked change to a light-brown color.

The antioxidant of this invention is conveniently prepared by the reaction of 2-methyl-6-tert-butylphenol with formaldehyde in the presence of an alkali metal hydroxide catalyst and using a monohydric alcohol as a solvent. This process is exemplified by the following example.

Example XI

In a reaction vessel equipped with stirring means, condensing means, thermometer and reagent introducing means was placed a solution of 6.6 parts of potassium hydroxide dissolved in 400 parts of isopropanol. To this solution was added 164 parts of 2-methyl-6-tert-butylphenol and 45.3 parts of 37 percent formalin solution while maintaining an atmosphere of nitrogen in the reaction vessel. The reaction mixture was heated for 2½ hours, cooled and poured into 1500 parts of cold water. The organic material was extracted with ethyl ether, the ether solution dried over magnesium sulfate and evaporated leaving a pale yellow crystalline product, melting point 96.5 to 98.5° C. This product was 4,4'-methylenebis(2-methyl - 6 - tert - butylphenol). Calculated for $C_{23}H_{32}O_2$: Carbon, 81.1 percent, hydrogen, 9.47 percent. Found: Carbon, 80.6 percent, hydrogen, 9.3 percent. The compound is soluble in water and has varying degrees of solubility in various organic solvents.

The amount of 4,4'-methylenebis(2-methyl-6-tert-butylphenol) employed in the rubber composition of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubber co-polymer of conjugated dienes with one or more polymerizable mono-olefinic compounds which have the capability of forming rubbery co-polymers with butadiene-1,3, outstanding examples of such mono-olefinic compounds being those having the group $CH_2\!\!=\!\!C\!<$, exemplified by styrene. Examples of such mono-olefins are styrene, vinyl naphthalene, alpha methyl styrene, para-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating 4,4'-methylenebis(2-methyl-6-tert-butylphenol) in any of the well-known elastomers which are normally susceptible to deterioration in the presence of air, such as elastoprenes, elastolenes, elastothiomers and elastoplastics.

We claim:
1. Natural rubber containing, as an inhibitor against oxidative deterioration, from about 0.01 to about 5 percent by weight of 4,4'-methylenebis(2-methyl-6-tert-butylphenol).
2. The rubber of claim 1 wherein said rubber is sulfur vulcanized rubber.

References Cited by the Examiner
UNITED STATES PATENTS

| | | | |
|---|---|---|---|
| 2,820,775 | 1/1958 | Chamberlain et al. | 260—45.9 |
| 2,875,174 | 2/1959 | Webb | 260—810 |
| 2,944,086 | 7/1960 | Coffield et al. | 260—45.9 |

JOSEPH L. SCHOFER, *Primary Examiner.*

JOSEPH R. LIBERMAN, *Examiner.*

HARRY WONG, *Assistant Examiner.*